Figure 1:
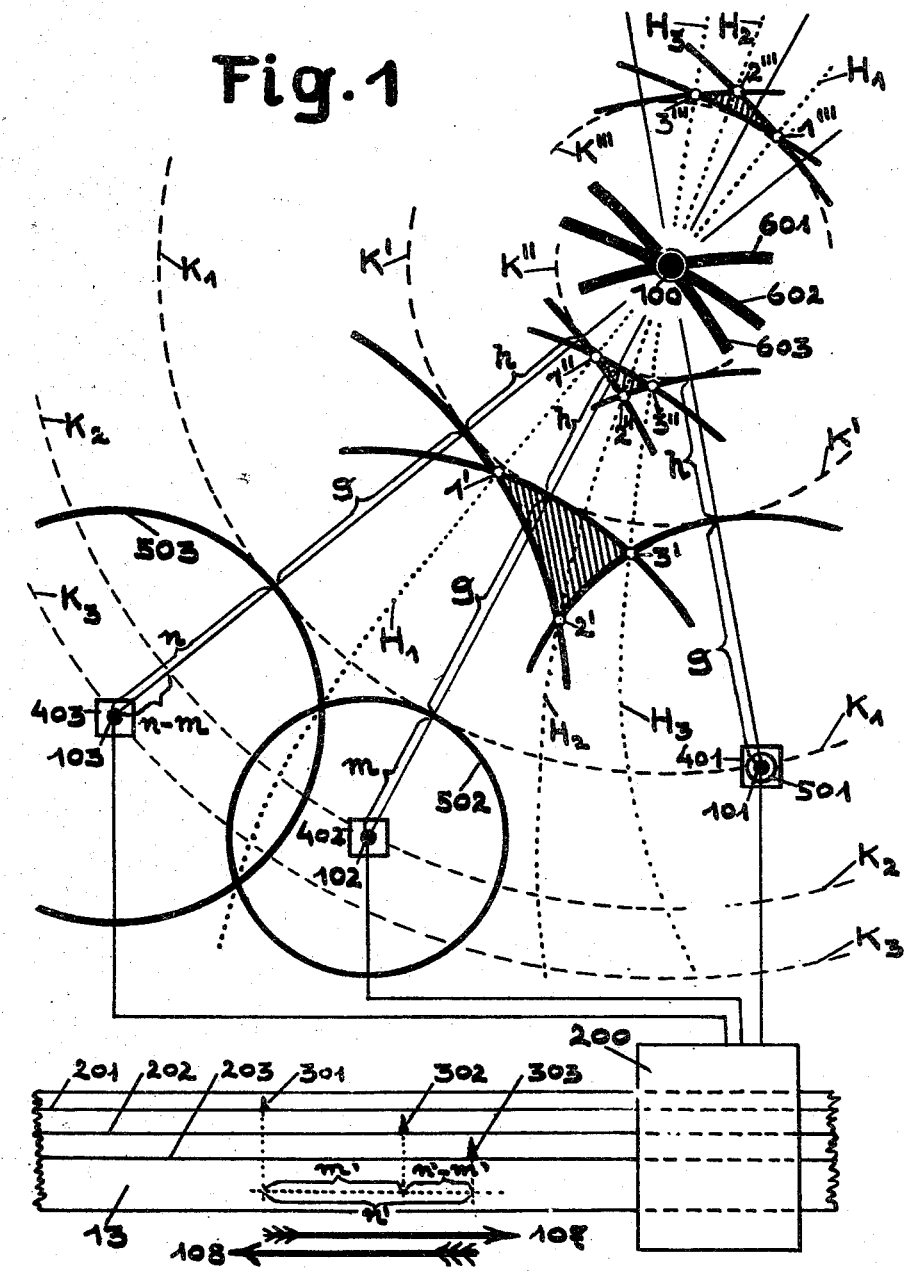

May 3, 1955 F. MÜLLER 2,707,330
METHOD FOR THE INVESTIGATION AND CONTROL OF WAVE FIELDS
Filed July 21, 1947 3 Sheets-Sheet 1

INVENTOR.
BY FELIX MÜLLER

May 3, 1955  F. MÜLLER  2,707,330
METHOD FOR THE INVESTIGATION AND CONTROL OF WAVE FIELDS
Filed July 21, 1947  3 Sheets-Sheet 2
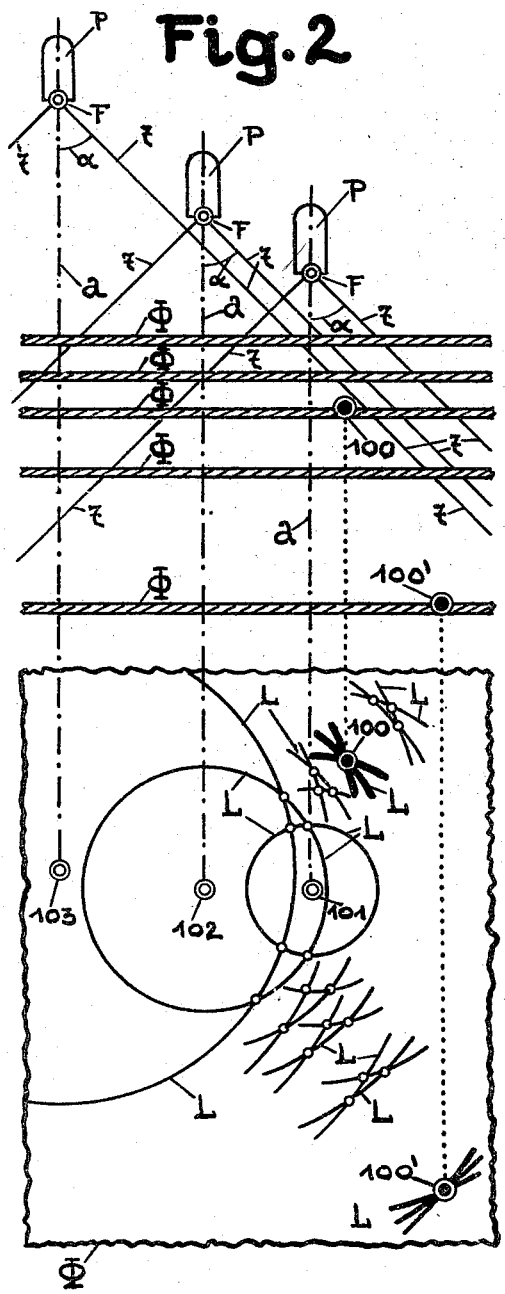
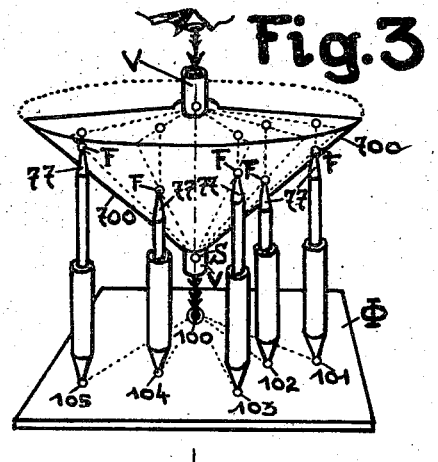
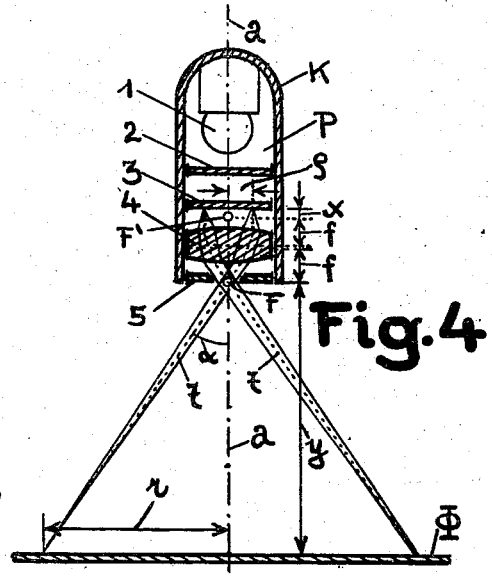
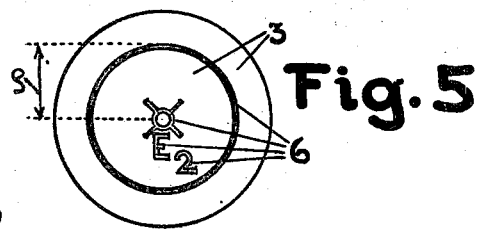
INVENTOR.
BY FELIX MÜLLER

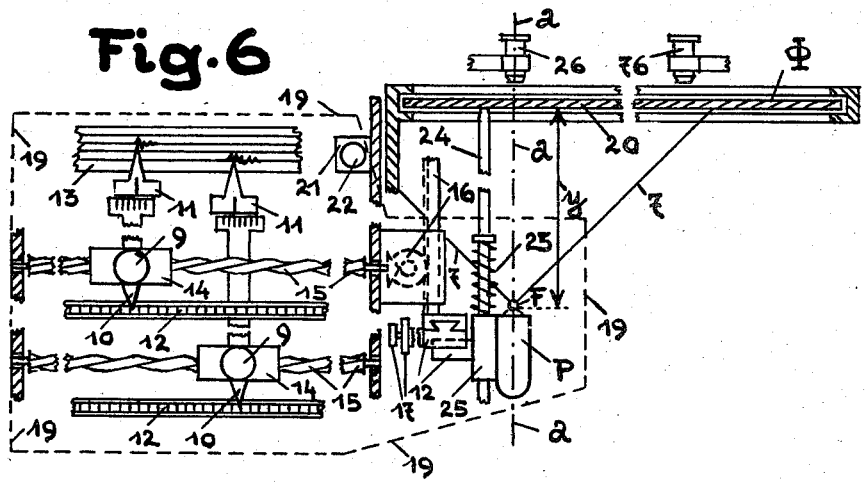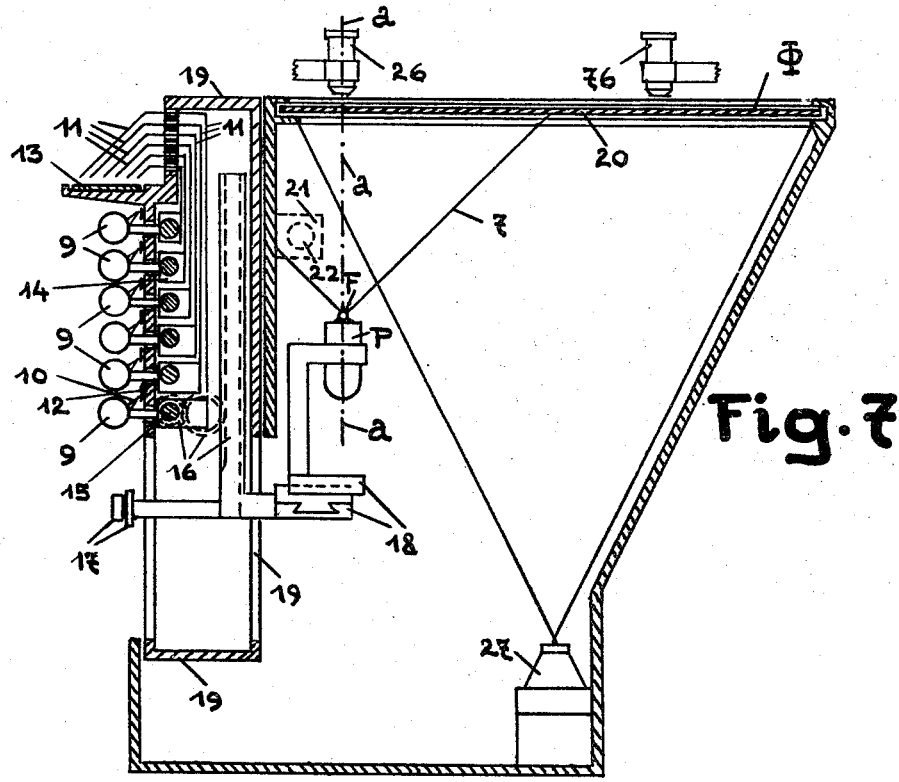

2,707,330

METHOD FOR THE INVESTIGATION AND CONTROL OF WAVE FIELDS

Felix Müller, Vienna, Austria

Application July 21, 1947, Serial No. 762,360
In Germany March 9, 1940

Section 1, Public Law 690, August 8, 1946
Patent expires March 9, 1960

3 Claims. (Cl. 33—1)

The object of this invention is to provide a method and an apparatus to solve all those technical problems which arise out of the following two fundamental problems.

(1) The oscillations in a wave field (a medium which sustains wave motion imparted to it by any sources) are to be recorded in oscillograms at a sufficient number of places and, by evaluating the oscillograms obtained, the locations of the sources (transmitters) and the state of wave motion at any desired place are to be determined.

(2) Wave motion is to be set up in a medium at a sufficient number of places and in such a way as to produce the desired state of wave motion at any desired place.

The first fundamental problem is confined to the investigation of given facts. Part of the facts is ascertained by direct measurement, the rest by evaluating the results of these measurements based upon known properties of the medium. A method which solves this fundamental problem makes it possible to determine the positions in respect of each other of objects in space (transmitter in respect of receiver), and also to investigate all the other properties of the field, e. g. all phase differences, proportions of intensity, etc.

The second fundamental problem is concerned with the setting up of desired conditions. A method which solves this fundamental problem makes it possible to control wave fields, i. e. to build up new fields as desired; to change existing fields, and in particular to regulate all phase differences and proportions of intensity; to achieve various effects upon objects of various positions; to control remote objects, etc.

The methods and instruments so far known for the investigation and control of wave fields fall considerably short of their object. These fundamental shortcomings partly concern the recording, since certain important phenomena are not recorded, and for that reason can not be evaluated. They also concern, however, the evaluation in general, which as a rule is carried out in too complicated a way. The resulting drawbacks make it necessary to limit the investigation or control of wave fields over large distances to a few special cases, or else to carry them out with but little accuracy.

Under these circumstances the invention offers a considerable improvement.

To prove this statement the conventional methods in the field will be reviewed and compared with the method which is object of this invention.

The best known apparatuses for the investigation and control of wave fields are lenses and mirrors, collectively called "objectives." They might be called—as might the apparatus which is part of this invention—"apparatuses for locating and reproducing the transmitters of waves of a wave field." Inserted into a wave field they change appreciably the prevalent spatial distribution of the energy of oscillation. By selecting the material and shaping the surface of these objectives taking account of the laws governing diffraction, reflection, and refraction, real or virtual maxima of the energy of oscillation can be produced in the new wave field set up by their insertion into the original wave field. The arrangement of these maxima in respect of the objective bears a geometrical relation to the arrangement of the transmitters. These maxima, since they determine by their own positions and states of wave motion those of the transmitters, are the real, or the virtual, respectively, point-shaped images of those transmitters. An objective can be used, on the other hand, for instance, to set up a maximum of intensity at a predetermined point in space, to lead it along a predetermined path, and to produce at this maximum a predetermined state of wave motion; by setting up an appropriate transmitter at the corresponding point, moving this transmitter along the corresponding path, and making it transmit according to the state of wave motion desired at the maximum.

The advantages of the objectives are their automatic function, and the very simple handling due to their small size. It is just this small size, however—adhered to in order to avoid difficulties in their construction—which limits the usefulness of these objectives.

In the locating of remote objects but little accuracy can be achieved because the power of resolution, i. e. the capability to reproduce adjacent transmitters by means of maxima separated in space, is in direct proportion to the sine of half the angle of aperture, which is defined as the angle under which appears the diameter of the objective as observed from the position of the transmitter.

The fact that the power of resolution increases with decreasing wave length can be turned to advantage by the above mentioned apparatuses. The positions of transmitters of waves which are long compared to the feasible size of the conventional objectives, however, cannot be determined or reproduced at all by these apparatuses so that their application is largely confined to optics.

Another disadvantage is the shape of the objective which is strictly correct only for that relative position of a transmitter of waves for which it has been calculated and produced. Only for this transmitter the objective renders an "aplanatic reproduction," that is a maximum of intensity in one point in which all the waves arriving from the corresponding transmitter point are superposed in equal phase. For transmitters at other positions the objective thus calculated is at best only approximately correct.

Also, since the energy necessary for the production of the maxima comes entirely from the supply made available by the transmitters to be reproduced, and since this supply is further limited by the small size of the objective, no great quantities of energy can be transferred to predetermined points in space by such apparatuses.

Furthermore, to achieve a geometrically similar reproduction with the aid of these apparatuses—the plane mirror excepted—all transmitter points should lie approximately at least in a plane at right angles to the axis of the objective. All other arrangements of transmitter points, and in particular one in a plane parallel to the axis of the objective, lead to perspectively contorted reproduction, so that the evaluation of such a reproduction for measuring purposes is made difficult.

An essentially different method for locating, or reproducing the transmitters of waves of a wave field makes use of at least three receivers of waves set up at different positions in the wave field, which record the waves received in oscillograms. The transmitters of waves are located, or reproduced, by an evaluation unit which utilizes the recorded oscillograms, the distances between the receivers (measuring bases), and the velocities of propagation of the waves.

Even though—as against the regular shape of a lens or a mirror—the arrangement of the receiver positions is not subject to a rigid prescription and also the diameter of the measuring system may be chosen as large as desired, and even though the methods and apparatuses for the recording of the oscillations received have reached a high degree of technical perfection—these recordings are preferentially taken with the aid of oscillographs adjusted especially for the measuring system in question, which function electrically or electroacoustically, i. e. free from inertia—an appreciable part of the accuracy and of the speed which can be achieved in the recording is lost due to the shortcomings of the methods for the evaluation of the recordings.

In principle, in the evaluation of the recordings hyperbolas, or hyperboloids, respectively, are made to intersect, and the points of intersection thus obtained serve as the point-shaped images of the positions of the transmitters. These hyperbolas, or hyperboloids, respectively, are derived from their foci and the length of their real axis in such a way that two each of the positions of the receivers used in the measuring system constitute the focal pair, and that the difference of the time distances of a wave—as recorded oscillographically at the measuring base—multiplied by the average velocity of propagation of the waves constitutes the length of the real axis of the hyperbola concerned, or of the hyperboloid generated by rotation of that hyperbola around the measuring base, respectively.

Not only is the numerical calculation of the hyperbolas, or hyperboloids, and their points of intersection tedious, their graphical representation inaccurate and troublesome even when use is made of the known mechanical devices; the hyperbolas, or hyperboloids, are also fundamentally unsuitable determination elements in the evaluation problem concerned, seeing that even at comparatively short distances of the sources of wave motion from the receiving installation the angles of intersection of these curves, or areas, respectively, are too small to allow an exact determination of the points of intersection.

These shortcomings tend to make the determination of positions even more difficult when, during the time of exposure of the receiving installation, waves are registered which were derived from more than one cause. Several transmitters at different positions might transmit one short oscillation impulses each; or one transmitter might transmit several short impulses in periodic intervals, said intervals being short compared to the time distance of a wave along a measuring base; or several transmitters at different positions might transmit in the way just mentioned; or one transmitter might transmit continuous oscillations—i. e. periodic oscillations without intervals—in such a way that the ratios $b/\lambda$ are larger than $\tfrac{1}{2}$, where $b$ stands for the length of a measuring base and $\lambda$ for the length of that wave upon which the comparison of the oscillographically registered phase differences is based; or, finally, several transmitters might transmit in the way just mentioned.

A determination of positions under the conditions as described above necessitates the use of many receivers, even though in all these cases the theoretically sufficient number of receivers is four in one plane with the receiver, otherwise five. The oscillograms then contain the recordings from all transmission causes, so that it can not be directly determined which recordings of different receivers are coherent, that is to say which recordings belong to one cause, and from which time intervals therefore the correct hyperbolas, or hyperboloids, respectively, should be calculated. For this reason at the evaluation either several combinations of the registered time intervals are tried one after the other; or else all the hyperbolas, or hyperboloids, respectively, corresponding to the correct as well as to the incorrect combinations are reproduced, and a control is achieved by selecting from out of all the points of intersection those as the images representing the transmitters, in which $z.(z-1)/2$ hyperbolas, or hyperboloids, respectively, intersect, $z$ being the number of the receivers. The determination of positions in this way is laborious as well as inaccurate because the sum of all errors makes control difficult, if not impossible.

It is because of these shortcomings of the method of evaluation that the method for the determination of positions as described is only used for special, very simple problems, and that in particular the determination of the positions of transmitters is carried out in such a way that, in the case of transmitters which transmit continuous periodic oscillations, every base for phase comparison in the wave field is avoided which would require a difference of time distances of a wave greater than the phase difference—as shown by the oscillograms—of the two corresponding receivers. This limiting condition imposed upon the base system or the wave length, and therefore upon the measuring system as a whole, really only serves to facilitate the determination of the correct points of intersection, that is the evaluation of the recordings; while the recording itself is considerably impaired. Indeed this condition is a grave sacrifice, made for an easier evaluation, at the cost of the accuracy of the determination of the positions. This is easily seen from the fact that the degree of accuracy—same as the power of resolution of an objective—is directly proportional to the base lengths, and inversely proportional to the wave lengths.

A particular problem to be solved by the method just related is the determination of positions with the aid of directions (bearings). In the vicinity of the end-points of a base—large compared to the distance from the transmitter—very small bases are set up, and only at these small bases, not at the large base, differences of time distances are measured. As a rule these small bases are so adjusted that they can be rotated (instruments for taking bearings, e. g. acoustic direction finders). The effect aimed at by each of these small bases is that the hyperbola determined by the small base and by the difference of time distances measured at this base may be regarded as straight line at each position of rotation of the small base, and at two certain positions of rotation really is a theoretically straight line (perpendicular upon the midpoint of the base, or an extension of that base, respectively, according to whether the difference of time distances is zero, or a maximum); and that the position of the transmitter is thus found as the point of intersection of straight lines (viz. the bearings taken). These are much simpler determination factors than are hyperbolic curves, and due to the large base mentioned also the angle of intersection of such bearings is large. Each of these bearings, however, can be determined with but little accuracy because of the very small size of the base as compared to the distance from the transmitter. Apart from the fact that the construction of the perpendicular upon the midpoint of the small base, or of its extension can not be done accurately, even a relatively large side-way movement of a remote transmitter leaves the difference of its distances from the end-points of the small base practically unchanged. The direction-finding apparatus is unsensitive to such a movement. Here again we find a measuring system in use which sacrifices the accuracy of the determination of a position for a simpler evaluation of the recordings.

Other known methods of this sort for the determination of positions make use of a group of transmitters (in particular transmitters of sound waves) at different positions to distribute the energy of oscillation in a predetermined vicinity according to a model, as, for instance, in acoustics of music halls; or to set up a strong maximum of the energy of oscillation in a small spherical vicinity of some predetermined point—in sharp contrast to the further vicinity of that point—as, for instance, in the treatment by irradiation of parts within the body of a patient. For these purposes the desired distribution of intensity in space is achieved either by rearranging the transmitters in space; by changing their intensity of transmission; by insertion into the wave field of lenses or mirrors; by generating parallel wave fronts—i. e. a directed ray—by means of a large group of transmitters set up in one straight line, or in one plane, and transmitting in equal frequency and in equal phase; or by rearranging such groups of transmitters of directed rays in such a way that the directed rays intersect within the narrow vicinity of a predetermined point. By all these methods the desired distribution of the energy of oscillation can only be approximated, no aplanatic point-shaped images, and therefore no sharp maxima, can be set up in space.

The method and the apparatus which are object of this invention combine and add to the advantages, while they avoid the disadvantages of the methods and installations described above. The method is best explained by starting from Huygens' principle which states that from each point of a wave field at the instant it is struck by any wave a new wave is emanated, and that this so-called "fundamental wave" is propagated in all directions in space, and quite independent of the fundamental waves which are emanated from all other points of the wave field, while at each point the interference of all the fundamental waves results in the prevalent state of wave motion at that point.

The lenses or mirrors are constructed taking account of these fundamental waves emanating from the points at their surface, and the superposing fundamental waves are used directly for the reproduction of the transmitters and for the determination of their positions. In a different way the other installations mentioned indeed register oscillographically the waves received in the wave field, and thus really also the determination factors for the fundamental waves emanating from the points of reception. At the next step, however, failing to recognize the value of the fundamental waves mentioned, and without making use of them, hyperbolas, hyperboloids, bearings, directed rays, or such-like, are defined, calculated, or constructed; and their points of intersection used to provide in this round-about way the point-shaped images of the transmitters.

Compared to this the method which is object of this invention chiefly comprises: receiving the waves by means of at least three receivers of waves arranged at different positions in the wave field, and recording in oscillograms—in the sequence of the instants of reception—the values of the amplitudes and of the relative phase differences of the oscillations received; reproducing those fundamental waves which have been propagated according to Huygens' principle from out of the positions of said receivers, said reproducing carried out using an arrangement of starting points of the reproductions of said fundamental waves similar in relative position to the arrangement of said receivers, and a sequence of starting times of said reproductions similar to the sequence of the instants of reception as recorded in oscillograms; and in this way obtaining—due to the superpositions of said reproductions of said fundamental waves—point-shaped images representing the positions of the original transmitters of waves, said images being virtual or real according to whether the selected sequence of the starting times is similar in the positive, or in the negative sense, respectively, to the sequence of the instants of reception as recorded in oscillograms.

The scales of representation can be chosen at will—viz. so as to conform best to the prevalent conditions—and the reproduction of the fundamental waves can also be carried out with the aid of any desired means of reproduction. In particular it is suggested, according to this invention, to achieve this reproduction by means of transmitters in a medium capable of sustaining wave motion, or (in particular cases) with the aid of cones in a three-dimensional system of coordinates.

Thus, for instance, one procedure of the method which is object of this invention comprises: receiving the waves by means of at least three receivers of waves arranged at different positions in the wave field, and recording in oscillograms—in the sequence of the instants of reception—the values of the amplitudes and of the relative phase differences of the oscillations received; reproducing those fundamental waves which have been propagated according to Huygens' principle from out of the positions of said receivers, said reproducing carried out by a group of transmitters set up at the original positions of the receivers, or arranged in relative position to said receivers, and transmitting oscillations the phase relations of which are tuned in accordance with the phase relations as recorded oscillographically by the corresponding receivers, and in this way obtaining—due to the interferences of the transmitted oscillations—point-shaped maxima of intensity as images of the positions of the transmitters of waves of the first wave field, said images being virtual or real according to whether the signs of the relative phase differences of the oscillations transmitted by the transmitters in the second wave field were selected equal, or opposite, respectively, to the signs of the relative phase differences recorded oscillographically by the corresponding receivers in the first wave field.

The advantages over the conventional methods are evident. While, for instance, the construction of hyperbolas, etc., and the determination of their points of intersection is difficult, the waves serving for the evaluation are propagated automatically in the second wave field, and automatically render the maxima which are the point-shaped images of the positions of the transmitters of the first wave field. The number of the causes of wave motion to be located, and the ratios $b/\lambda$— in whatever way selected—are quite irrelevant for the purpose of evaluation; as against the evaluation by means of hyperbolas they do not lead to the difficulties mentioned, provided that here again the number of receivers employed is sufficient (the larger this number, the sharper the maxima). At least four, or five receivers, respectively, are needed, according to whether a level, or a three-dimensional measuring system is in the case. The determination of positions is also made essentially more accurate by the fact that the reproductions of the fundamental waves intersect at all point-shaped images at angles which are twice as large as those at which the hyperbolas, or hyperboloids, respectively, intersect. This is obvious, since the tangents, or the tangential planes to the hyperbolas, or the hyperboloids, respectively, cut in half the angles between the straight lines connecting the point of intersection with the foci; while in our case the tangents, or the tangential planes to the circular or spherical waves, respectively, are at right angles to said lines, and therefore enclose the same angles as do these lines.

The advantages over the lenses or mirrors consist— apart from the possibility to concentrate great amounts of energy—mainly in the fact that for each desired arrangement of the transmitters and of the points of reception all the point-shaped images are aplanatic, and that always a geometrically similar reproduction can be achieved, also that hardly any limitations are imposed upon the diameter of the receiving system. This last advantage is most pronounced in the great power of resolution in the reproduction of adjacent transmitters situated at a large distance from the system of reception and, for instance, close to a position which is already known. The advantage is easily understood, since the phase relations registered oscillographically in a great base network are changed in measurable, and therefore evaluable degree when a distant transmitter is moved even a small way. In these cases of the reproduction of remote groups of transmitters the proposed method becomes particularly simple because the relevant parts of the fundamental waves to be reproduced may be regarded as level wave fronts, so that a superposition of directed rays under known mutual angles of inclination and known phase relations is sufficient to reproduce in the vicinity the remote group of transmitters.

Other advantages of the method are revealed when the transmitters of the second wave field are set up at the positions formerly occupied by the receivers of the first wave field (congruent transformation of the given measures). The real point-shaped images are generated, or the virtual point-shaped images appear, respectively, directly at the positions of the sources of wave motion of the first wave field, no matter whether or not the existing medium is isotropic.

The fundamental principle and further characteristics of the invention will now be described with the aid of detailed examples, and with reference to the drawing. The invention is, of course, not confined to these examples. Even though in these examples in particular sources of sound waves are mentioned, said examples elucidate the general principles of the invention also for all other types of waves, and for all other practical applications, since the fundamental laws governing the propagation of waves hold good for all mechanical and electro-magnetic waves. In general it might be regarded as an object of this invention to provide a method and an apparatus for the solution of the problem of Apollonius, that is the proposition to determine the center of a circle, or of a sphere which contacts at least three, or at least four predetermined circles, or spheres, respectively.

Fig. 1 of the drawing shows a conventional measuring system, and—in comparison—the conventional and the proposed principle of evaluation, as well as an example of the proposed installation for the evaluation.

In Fig. 2 the elevation and the ground plan of a mainly optical installation for the evaluation according to the invention, and the procedure of evaluation are shown.

Fig. 3 concerns a proposed, mainly mechanical, installation for evaluation.

Figs. 4–7 represent details of the apparatus shown in Fig. 2.

In Fig. 1 point 100 represents the position of a source of sound. Points 101, 102, and 103 represent measuring positions at which receivers of sound waves (microphones) are put up. The receivers are electrically connected to an oscillograph 200 adjusted for the sound-measuring system, and registering upon a sound-measuring film 13 in lines 201, 202, and 203, corresponding to measuring positions 101, 102, and 103, short-lasting sound impulses in the form of deflections 301, 302, and 303, respectively, when the corresponding receivers receive short-lasting sound impulses from the medium carrying the sound. In the example shown in this figure of the drawing, measuring position 101 is at the shortest distance from the position 100 of the source of sound, so that measuring positions 102 and 103 are outside the circle $K_1$, described around the source of sound at 100 and passing through measuring position 101. They lie upon circles $K_2$, and $K_3$, respectively, which are concentric around $K_1$, and the radii of which are larger by distances $m$, and $n$, respectively, than the radius of $K_1$. It follows, that when out of the center of sound 100 the wave of a short-lasting sound impulse is propagated in the shape of a sphere, said wave will occupy at three well-defined moments the positions of the circles $K_1$, $K_2$, and $K_3$, respectively; at those moments the receivers set up at measuring positions 101, 102, and 103, respectively, will each receive one sound impulse, and the oscillograph 200 will register a deflection 301, 302, and 303 upon each line 201, 202, and 203, respectively, of the sound-measuring film 13, and in such a way that the time intervals $m'$, $n'$, and $n'$—$m'$—appearing upon the sound-measuring film in a certain arrow-direction 107 for the positive counting of time—which are the differences of the time distances of the wave, are in proportion to the distances $m$, $n$, and $n$—$m$, respectively. If in this conventional measuring system the position 100 of the source of sound is unknown, this position can be determined with the aid of measuring positions 101, 102, and 103, and the lengths $m$, $n$, and $n$—$m$ measured by means of the sound-measuring film. In the drawing the hyperbolas $H_1$, $H_2$, and $H_3$ conventionally used in the evaluation are represented by dotted lines. Their foci lie in pairs at the measuring positions; their real axes of the length $n$—$m$, $n$, and $m$ (which are not shown in the drawing) lie at the corresponding measuring bases 102—103, 103—101, and 101—102, respectively; their common point of intersection 100 is the point-shaped image of the position of the source of sound to be determined.

As against this, according to the invention position 100 is determined as follows:

Those fundamental waves which are propagated according to Huygens' principle from out of the positions of the receivers (positions 101, 102, and 103, respectively) are reproduced. This reproducing can be carried out after the scales and their sign (positive or negative) have been established for a transformation—selected at will—of the given measure and their sign. The simple case is chosen to serve for the example at hand that all scales remain unchanged, and that only the sign of the differences of the time distances as registered oscillographically is reversed; and that transmitters of sound waves and the existing medium carrying sound motion are employed as means of reproduction. Accordingly the receivers of sound at the measuring positions 101, 102, and 103 are replaced by the transmitters of sound 401, 402, and 403, respectively, and—based upon the recordings of sound upon film 13, taken at the original sound field, and upon a counting of time according to the arrow-direction 108, which is reversed to the counting of time represented by arrow-direction 107—one short-lasting impulse of sound is transmitted into the medium by each of the transmitters of sound. That means that with the aid of the sound-measuring film 13 run off in the reverse direction of the sequence of reception the transmitter 403 transmits the first impulse of sound, transmitter 402 in its turn starts later than transmitter 403 by an interval $n'$—$m'$, and finally transmitter 401 later than transmitter 403 by an interval $n'$. The result is that at the same instant at which transmitter 401 starts to transmit its impulse, and while the radius of wave 501 starting from it is still zero, the radii of sound waves 502 and 503 transmitted earlier by the transmitters 402 and 403 are already of the lengths $m$, and $n$, respectively, and that at this instant all three waves contact the still unknown circle $K_1$ the center of which—likewise still unknown—is the center of sound to be determined of the first wave field. A further result is that the radii of all three waves 501, 502, and 503 are increased during any intervals by equal amounts —e.g. $g$, $h$, etc; and that this common increase takes place at the expense of the radius of circle $K_1$ which thus is turned into the concentric circles $K'$, $K''$, $K'''$, etc., and necessarily shrinks into a point which is the requested point 100. At this impressive state of the proceedings all three sound waves 601, 602, and 603 intersect at the requested point 100, and there results an impressive superposition of all three sound impulses to one single sound impulse characteristic for this point. If the cause of sound transmission in the first wave field was an increase, or a decrease of pressure, respectively, the wave set up was also a (positive or negative) pressure wave, and upon the oscillograms on sound-measuring film 13 resulted deflections 301, 302, and 303 in equal direction. For that reason also in the second wave field the waves at state 501, 502, 503, and at each following state—in particular at state 601, 602, 603—were (positive, or negative, respectively) pressure waves. The superposition of these waves at point 100 therefore takes place in equal phase so that the source of sound of the first wave field is here reproduced aplanatically. At each earlier or later state of the proceedings the real points of intersection of two sound waves each are the corners of a triangle composed of arcs of circles. In the drawing such triangles composed of arcs of circles appear shaded. These triangles also shrink during the proceedings into the point 100, passing which point they reappear again. At the same time the corners 1′, 1″, 1‴, etc.; 2′, 2″, 2‴, etc.; and 3′, 3″, 3‴, etc. describe the hyperbolas $H_1$, $H_2$, and $H_3$, respectively, which conform to the hyperbolas earlier mentioned. Even though these hyperbolas are thus produced incidentally also by the proposed method, the requested point 100 is obtained quite independent of these hyperbolas and without having to take any account of them. Point 100 is obtained in a far simpler way as the point of intersection of the circular waves 601, 602, and 603. As mentioned before, its position is obtained also more accurately because the angles of intersection of these circles are twice as large as the angles of intersection of the hyperbolas.

If, with the aid of the drawings the proceedings just related are supposed to be reversed, the three in this case imagined circular waves shrink from infinite distance into their centers 101, 102, and 103. They go through the states shown in the drawing, in reversed sequence, have as envelope always a circle with its center in point 100, and represent in their common intersection in point 100 an imagined (that is virtual) image of the cause of transmission of the first wave field. At state 501, 502, 503 the imagined circle 501 is already a point while the imagined circles 502 and 503 have still the radii $m$, and $n$, respectively. If these proceedings are supposed to be continued in the same way, circle 503 must also shrink into a point 103. Up to this state around point 101 a new circle with the radius $n$, and around point 102 a new circle with the radius $n—m$ must have been produced which are not shown in the drawing. These three imagined circles have in this state as envelope the circle $K_3$, have the sequence of starting indicated upon sound-measuring film 13 by the arrow 107, and grow into the infinite while they become more and more flattened out, attaching themselves more and more to their envelope until very soon they together replace said envelope. They can be realized with the aid of transmitters 401, 402, and 403, when the impulses are transmitted in the sequence indicated by arrow 107 upon film 13. This procedure, however, is nothing else but a reproducing of the fundamental waves propagated from out of the positions of the receivers of the first wave field under observance of the sign of the time differences as registered oscillographically, which reproducing is effected with the aid of transmitters 401, 402, and 403. Taking account of the rapid approximation of the waves to their envelope the transmitters make the impression upon an observer (or, for instance, upon an apparatus for taking bearings) that only one powerful wave is propagated from out of point 100, even though there is no transmitter actually at this point in the second wave field. The cause of transmission of the first wave field is thus reproduced virtually with the aid of the group of transmitters mentioned above. When three measuring positions are used situated in one plane with the source of sound, then in this plane a second point of superposition and a second envelope of the three sound waves must be taken into account as a second, possibly misleading solution. In a plane a definite and unambiguous determination of position is safeguarded only by four measuring positions which are not arranged in a straight line. The method remains unchanged when the measuring system is three-dimensional. In place of the circular fronts of sound waves spherical wave fronts are now in the case, and the real, or virtual point-shaped images, respectively, are now obtained in the three-dimensional system. In this case four measuring positions are required for a double, and five measuring positions which lie not in one plane for an unambiguous determination of position. It is evident that the effect of the superposition of all sound waves is the better defined and the sharper, the more measuring positions are used. A further advantage lies in the fact that the procedure of the method is not made more difficult when the oscillograms on sound-measuring film 13 are the result of many causes of sound, and it is of no importance whether the causes of sound are at different locations; whether they are active at different times or continually; and what are the relations of the wave lengths to the base lengths. Because of the independence of each other of all waves the sound-measuring film shows the results of the superpositions at the points of reception of the first wave field, and this sound-measuring film—according to whether it is run off conforming to arrow-direction 108, or to arrow-direction 107—yields in the second wave field the real, or the virtual point-shaped images, respectively, of the positions of the causes of sound of the first wave field.

It is not necessary to give an exact description of the details of the devices for the receiving and recording of the oscillations in the first wave field, and for the transmitting of the oscillations in the second wave field, seeing that the construction details for receivers, phase meters, phase regulators, transmitters, etc. are well known already for all kinds of waves and for almost all wave lengths.

Details of the apparatus for the evaluation are described, however, for the particular case that the reproducing of the fundamental waves propagated according to Huygens' principle from out of the positions of the receivers is carried out not by means of actually transmitted, but by means of symbolically represented waves.

If, for instance, in Fig. 1 the circle of sound waves 502 is regarded as circle of intersection with the plane of the drawing, of a cone the vertex of which is situated vertically above measuring position 102, and if the plane of the drawing is lowered relative to said cone, the circle of intersection is extended by an amount which is in proportion to this displacement. The same holds good for corresponding cones passing through the circles of sound waves 501 and 503, with vertices above measuring positions 101 and 103, respectively. These cones may be regarded as time-way diagrams of the sound waves. The scale of length vertical to the plane of the drawing serves for representation of time. The trigonometrical tangent of the angles of inclination of the generatrices of the cone to the altitude of the cone corresponds—to the scales adopted—to the velocity of the sound. The differences in height of the vertices of the cones correspond in scale to the differences $m'$, $n'$, and $n'—m'$, respectively, of the time distances. A lowering of the plane of the drawing relative to the group of cones denotes a forward movement in time, a lifting of the plane of the drawing signifies a backward movement in time in the above-described second wave field. At this the circles of intersection 501, 502, and 503 extend, or shrink, with the same velocity, and give a representation of the waves in the forward, or backward movement, respectively. By necessity also the point of intersection 100 of the images of all sound waves is thus obtained. This is the point of intersection of all conical surfaces, and the point-shaped image of the cause of transmission of the first wave field. It is the vertex of an additional cone contacting the three other cones, and intersecting the plane of the drawing in circles $K_1$, $K'$, $K''$, $K'''$, etc., according to the position of said plane, each of these circles contacting the three other circles of intersection. The circles of intersection of the fourth cone shrink, or extend, in the same degree as the other circles of intersection extend, or shrink, respectively, so that a representation of any states of propagation of the waves is obtained. At this the hyperbolas $H_1$, $H_2$, and $H_3$ turn out to be the ground plans of the lines of intersection of the three conical surfaces above the measuring positions, and the rays 100—101, 100—102, and 100—103 turn out to be the ground plans of those generatrices along which the fourth cone contacts the other cones.

Point 100 is thus obtained either as the ground plan of the point of intersection of the three conical surfaces the vertices of which have as their ground plans the measuring positions; or it is obtained likewise as the ground plan of the vertex of an additional cone which is carried by the other cones, or—as might be the case—by fragments of those other cones, as, for instance, their vertices. Applications of these two methods of determination lead to one separate apparatus for evaluation for each method. These are schematically shown in Figs. 2 and 3.

For instance by means of the apparatus according to Fig. 2 the above-mentioned second sound field is optically reproduced. At least three optical projectors P, with optical axes $a$ arranged in parallel, project each one optical circular conical surface 7 into space. Each of these conical surfaces can be regarded as made up of an infinite number of circles of increasing radius which are all parallel to a projection screen $\Phi$ which serves as the perspective plane. The vertices F of the cones are vertically above the measuring positions 101, 102, and 103, represented in the perspective plane in an arrangement similar to that of the measuring system. They are adjusted at heights the differences of which are in proportion, in a reversed counting of time, to the differences of the time distances of a sound impulse as registered by the corresponding receivers. The generatrices of the cones are at those angles $\alpha$ of inclination to the perpendicular $a$ the trigonometrical tangents of which correspond in scale to the velocities of the sound in the directions given by the ground plans of the generatrices of the cones. The projection screen can be moved relative to the group of projectors, and at each position shows its lines of intersection with the conical surfaces as circular luminous images L. A displacement in parallel of the projection screen causes upon the latter an optical representation of the second wave field at each desired state, and necessarily leads to a position at which the simultaneous intersection of the luminous images L of all the sound waves yields the luminous image 100 of the point of transmission of the first wave field. The second solution 100' can be avoided when the number of measuring positions is at least four, and when not all measuring positions are arranged in a straight line.

The apparatus for evaluation according to Fig. 3 consists in principle of a measuring plate $\Phi$ serving as the area for a ground plan, at least three adjustable carriers 77 having vertices F, serving as height marks, and an adjustable right circular cone 700 held with its base parallel to the measuring plate. Cone 700 contacts with its surface the vertices F and indicates upon the measuring plate $\Phi$ the ground plan 100 of the vertex S of the cone by means of the optical axis of a sighting device V. The vertices F are adjusted vertically above the measuring positions 101, 102, 103, 104, and 105, represented in the perspective plane $\Phi$ in an arrangement similar to that of the measuring system. They are adjusted at heights the differences of which correspond in reversed counting of time to the differences of time distances of a wave registered by means of the corresponding receivers. The devices for mounting cone 700 and height marks F have been omitted in the drawing as unnecessary. The apparatus functions automatically. The sighting device V points at the requested position 100 corresponding to the point of transmission of the first sound field when the vertices F are adjusted correctly in the ground plan and in their height differences. Each chance adjustment of three vertices F brings about a certain definite position of cone 700 which in its turn controls the positions of the other vertices F and automatically points by means of sighting device V at that point upon the measuring plate which corresponds to said adjustment.

While the above apparatus has only been characterized in its principle, detailed examples of designs of various parts of the apparatus shown in Fig. 2 are given below.

Fig. 4 shows in longitudinal section a projector of the apparatus described with reference to Fig. 2. Source of light 1, condensor or ground glass 2, diaphragm 3, lens 4, narrow diaphragm 5, and light-excluding case K, as well as devices for adjusting these elements, produce a beam of light rays which is in principle confined to the surface area of a cone 7. Diaphragm 3 carries a curve 6 serving as object which in the example shown in the drawing (Fig. 5) consists of a circle, its center mark, and some designation of that mark (for instance a letter, a number, or such-like). Preferably this diaphragm is a photograph upon a glass plate of a circular line with a center mark, i. e. an opaque object with the exception of a thin ring and a small center mark which are transparent. An exact conical area is traced by that luminous image of the object which is produced by lens 4 of diaphragm 3 when the latter is moved along the optical axis $a$ relative to the lens. One of the rims of ring 6 is of radius $\rho$ and together with the focal length $f$ of the lens determines the surface 7 of a circular cone—dotted line in Fig. 4—the vertex of which is the focus F at the side of the image. The angle of inclination $\alpha$ of the generatrix of the cone to the optical axis $a$ is given by the formula $\tan \alpha = \rho/f = r/y = v$ in which $r$ stands for the radius of the image, variable with the distance $y$ of the image, and $v$ for the velocity of sound if measured according to the scale of length valid in the perspective plane for the distances in the measuring system, and according to the scale of length valid vertically to the perspective plane for time intervals. A quite exact representation of the cone is obtained theoretically only at the correct position of the image in each case, and necessitates a position of diaphragm 3 at a distance $x = f^2/y$ from the focus F' at the side of the object, and thus—with variable distances $y$ of the image—the employment of the usual, preferably automatic focussing devices such as are in use for photographic enlargement apparatuses. Sufficient compliance, however, with the theoretical condition for a clear reproduction $x.y = f^2$ for a relatively large range of values for $y$ is also obtained with resting diaphragm 3; for instance by means of a focal length small compared to the relevant distances $y$ of the image, if required by means of several diaphragms 3 arranged in series, by means of a particularly narrow diaphragm 5, or such-like.

The projection screen $\Phi$ shown in Fig. 2 is at the same time the area of the ground plan (measuring plate). It is agreed that for intercepting the point of intersection of all the conical surfaces of light an area of projection will also serve which is at any angle of inclination to the optical axes $a$ of projection, and independent of a measuring plane; and that the assembling of all elements of construction, as well as the details of the necessary fitting and adjustment devices, measuring scales, verniers, etc., can be carried out, subject to the principles usually observed in optics and instrument-making, according to various designs. However, to show the advantages and the method of application, a more detailed example, mainly suitable for the determination of the location of sound in artillery use is described below with reference to Figs. 6—7 in supplement to Figs. 2, 4, and 5.

Fig. 6 shows the parts of construction in combined longitudinal and cross-section, in fundamental connection with the adjustment and measuring devices.

Adjustable knobs 9 each move a pointer 10 and an adjustable pointer (pick-up of oscillations) 11. Pointers 10 contact scales 12, and pointers 11 contact the oscillograms displaced relative to each other and carried by a carrier 13 (that is preferably a sound-measuring film). Each knob 9 also carries a box 14. These boxes 14 are fitted as screw nuts, and each turns a long screw 15. The turns, by way of one adjustable cog-wheel transmission 16 for each screw 15, cause axial displacements of one projector P each. Every projector P is also adjustable at right angles to its axis $a$ by means of two centering screws 17 and a sliding support 18 which can be moved in two directions. A ground glass 20 which can be rotated or held in its plane Φ, and which is fitted with a system of coordinates, and serves as measuring plate and as area of projection, can be moved in the direction of the optical axis $a$ in respect of the entire fitting and adjustment installation 19 of the system of projectors, by means of a lifting device 21, by actuating rotary knob 22. All movements vertical to Φ of the projectors P are taken up by rods 24 which by means of springs 23 are forced in the direction of the ground glass and—according to their lengths $y$ standing out above the foci—control the projector diaphragms 3 (Figs. 4 and 5) according to the function $x.y=f^2$, by way of the focussing devices 25. Measuring microscopes 26 or 76 facilitate an exact center-adjustment of the projectors, or a more accurate determination of the optical points of intersection 100 of the light figures L (Fig. 2) either in the system of coordinates of Φ, or on a transparent map fixed upon Φ, or such-like. The mode of action of the apparatus is made evident by the description given with reference to Figs. 2, 4, 5, and 6, when Fig. 7 is taken into account.

Fig. 7 shows in longitudinal section the apparatus represented in combined longitudinal and cross-section in Fig. 6. The various parts are so arranged that the oscillograms on carrier 13, the positions of the pointers 11 contacting said oscillograms, and the measuring area Φ are easy to survey, and that all the adjustment devices can be employed independent of each other as upon a switch-board. In addition to the earlier mentioned projectors P, a further projector 27 is used to advantage which projects upon Φ images of landscapes, scales, etc., to facilitate a sufficiently rapid determination of the relative positions of the discovered sources of sound (targets) in respect of known positions in the territory.

What is claimed is:

1. In the producing of point-shaped images which determine the positions of the transmitters of waves of a wave field, the method which comprises: receiving the waves by means of at least three receivers of waves arranged at different positions in the wave field, and recording in oscillograms—in the sequence of the instants of reception—the values of the amplitudes and of the relative phase differences of the oscillations received; reproducing those fundamental waves which were, during said reception, propagated by Huygens' principle from the receiver positions, said reproducing carried out using an arrangement of the centers of the reproductions of said fundamental waves similar in relative position to the arrangement of said receivers, and using a sequence of starting times of the reproductions of said fundamental waves similar to the sequence of the instants of reception as recorded in oscillograms; and in this way obtaining—due to the superpositions of said reproductions of said fundamental waves—point-shaped images representing the positions of the original transmitters of waves, said images being virtual or real according to whether the selected sequence of the starting times is similar in the positive or in the negative sense, respectively, to the sequence of the instants of reception as recorded in oscillograms.

2. In the producing of point-shaped images which determine the positions of the transmitters of waves of a wave field, the method which comprises: receiving the waves by means of at least three receivers of waves arranged at different positions in the wave field, and recording in oscillograms—in the sequence of the instants of reception—the values of the amplitudes and of the relative phase differences of the oscillations received; reproducing those fundamental waves which were, during said reception, propagated by Huygens' principle from the receiver positions, said reproducing carried out by a group of transmitters set up at the original position of the receivers, or arranged similar in relative position to said receivers, and transmitting oscillations the phase relations of which are tuned in accordance with the phase relations of the recorded waves; and in this way obtaining in the second wave field—due to the interferences of the transmitted oscillations—point-shaped maxima of intensity as images of the positions of the transmitters of waves of the first wave field, said images being virtual or real according to whether the signs of the relative phase differences of the oscillations transmitted by the transmitters in the second wave field were selected equal or opposite, respectively, to the signs of the relative phase differences recorded oscillographically by the corresponding receivers in the first wave field.

3. In the producing of a point-shaped image which determines the position of a transmitter of waves, the method which comprises: receiving the waves by means of at least three receivers of waves arranged at different positions in the wave field, and recording in oscillograms—in the sequence of the instants of reception—the values of the amplitudes and of the relative phase differences of the oscillations received; reproducing those fundamental waves which were, during said reception, propagated by Huygens' principle from the receiver positions, said reproducing carried out by means of symbolical representation, using a three-dimensional system of coordinates of which two dimensions are used for a representation—to the scale selected for representing distances—of the relative positions of the centers and circumferences of said fundamental waves, and the third dimension of which is used for a representation—to the scale selected for representing time intervals—of the time distances of said fundamental waves; and in this way obtaining one cone for each fundamental wave to be reproduced, said cone serving as the image of said fundamental wave; and further obtaining a point-shaped image representing the position of the transmitter, by determining the point of intersection of the surfaces of these cones.

References Cited in the file of this patent

UNITED STATES PATENTS

| | | |
|---|---|---|
| 1,406,996 | Morrill | Feb. 21, 1922 |
| 2,144,203 | Shanklin | Jan. 17, 1939 |
| 2,198,113 | Holmes | Apr. 23, 1940 |
| 2,405,238 | Seeley | Aug. 6, 1946 |
| 2,406,953 | Lewis | Sept. 3, 1946 |
| 2,413,637 | Loughlin | Dec. 31, 1946 |
| 2,418,136 | Munson et al. | Apr. 1, 1947 |
| 2,432,625 | Klein | Dec. 16, 1947 |
| 2,470,114 | Sherwood et al. | May 17, 1949 |
| 2,487,822 | McLamore et al. | Nov. 15, 1949 |

FOREIGN PATENTS

| | | |
|---|---|---|
| 173,193 | Austria | Nov. 25, 1952 |